UNITED STATES PATENT OFFICE.

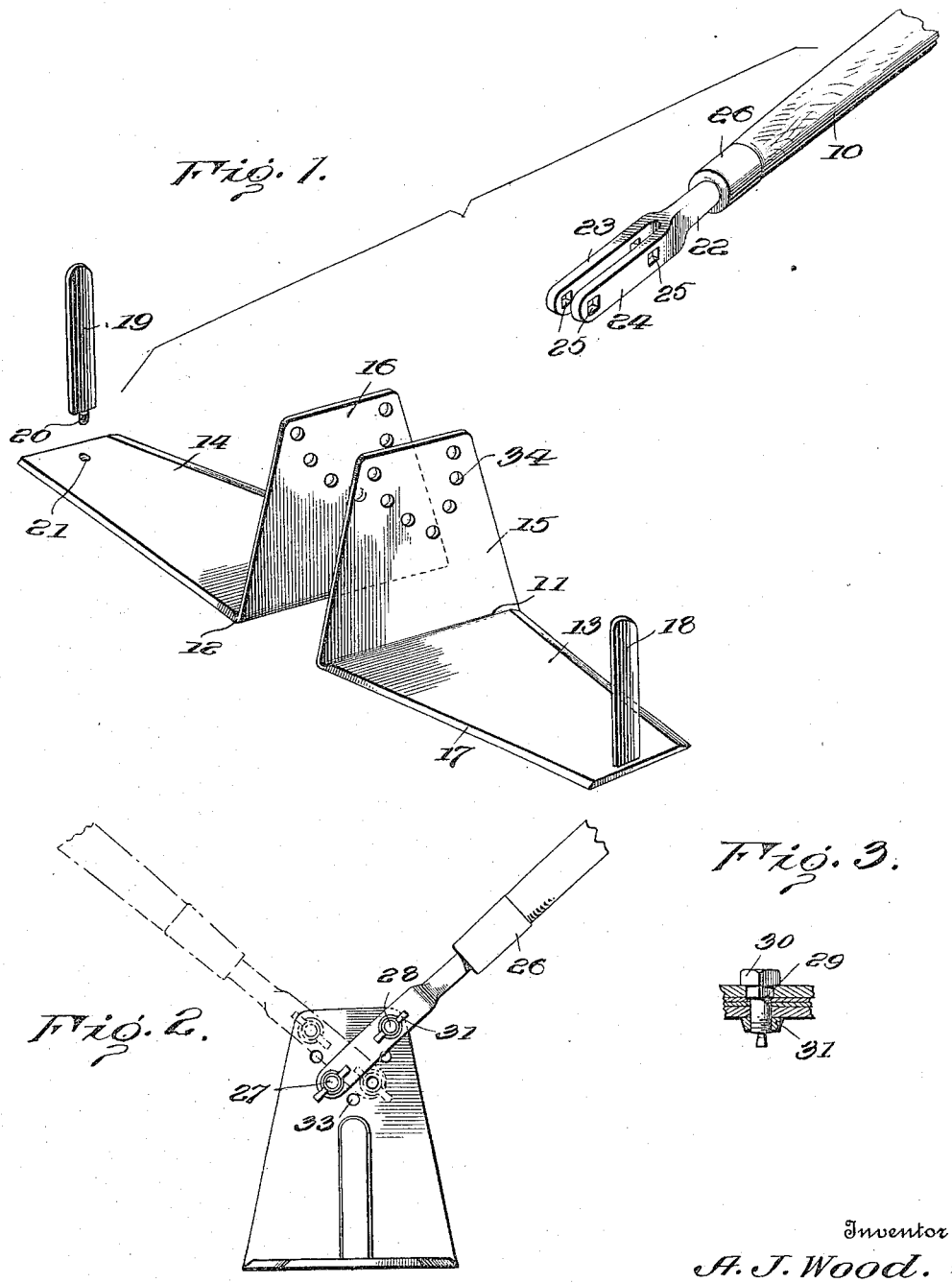

ALBERT J. WOOD, OF CLARKSTON, WASHINGTON.

HAND-WEEDER.

1,173,137.　　　　　Specification of Letters Patent.　　Patented Feb. 22, 1916.

Application filed September 10, 1914. Serial No. 861,052.

*To all whom it may concern:*

Be it known that I, ALBERT J. WOOD, citizen of the United States, residing at Clarkston, in the county of Asotin and State of Washington, have invented certain new and useful Improvements in Hand-Weeders, of which the following is a specification.

My invention relates to new and useful improvements in garden implements, and has particular reference to that type of such devices which are known as weeders and are adapted to be manually operated.

The principal object of my invention is to provide a garden implement of the type specified, which is relatively simple in construction, and may, therefore, be cheaply manufactured, and is designed in such manner that it may be easily and efficiently employed in cutting weeds between rows of vegetables.

Another and more specific object of my invention is to provide a garden implement which consists essentially in a pair of substantially L-shaped blade members, the corresponding portions of which are engaged with each other and form a body portion to which the handle may be adjustably attached.

A further object is to provide the cutting blades with guide members which are so arranged that the user of the implement may, at all times, determine, even though the blades be embedded in the earth, the exact location of the terminals of the blades whereby the implement may be used close to the rows of vegetables without danger of cutting them.

The above recited and other incidental objects of a similar nature, which will be hereinafter more specifically treated, are accomplished by such means as are illustrated in the accompanying drawings, described in the following specification, and then more particularly pointed out in the claims, which are appended hereto and form a part of this application.

With reference to the drawings, wherein there has been illustrated the preferred embodiment of this invention as it is reduced to practice, and throughout the several views of which similar reference characters designate corresponding parts, Figure 1 is a detail perspective view of the weeder, showing the parts thereof in disassembled relation but indicating the manner in which they are adapted to be assembled to form an operative structure. Fig. 2 is an end view; and Fig. 3 is a detail sectional view taken through the attaching shank which is employed in connecting the body of the weeder to the handle. This figure illustrates particularly the manner in which the connecting bolts are passed through the wing plates of the cutting blades and through the arms of the attaching shank.

As shown in the accompanying drawings, my weeder includes a handle 10 and a pair of substantially L-shaped plates 11 and 12. The lateral portions 13 and 14 of the plates constitute the cutting blades of the weeder, while the longitudinally extending portions 15 and 16 constitute, when they are engaged with each other, the body plate of the weeder.

The cutting blades 13 and 14 are substantially trapezoidal in shape, and are sharpened along their non-parallel edges, as indicated at 17. At the terminals of the blades are carried the removable guide members 18 and 19. These members 18 and 19 are preferably formed from metal and are provided at their terminals with threaded shanks or extensions 20. These extensions 20 are adapted to be threaded through the threaded apertures 21 which are formed in the blades 13 and 14 adjacent the terminals thereof.

It will be readily seen, particularly upon reference to Fig. 1, that when the guide members 18 and 19 have been properly engaged with the blades, their broad faces will lie flush with the terminal edges of the blades. The purpose in thus disposing the guide members will be hereinafter more particularly pointed out in that portion of the specification devoted to a description of the use of the implement.

The handle 10 is equipped with an attaching shank 22. The shank 22 is longitudinally bifurcated at one terminal, producing the parallel spaced arms 23 and 24, each of which is provided with spaced squared openings 25. A socket or ferrule 26 is formed on the other terminal of the shank 22 to receive the handle 10, as shown in Fig. 1.

In assembling the two cutting blades of the weeder, the body plates 15 and 16 are first placed flatly against each other and are then passed between the arms 23 and 24 of the shank 22. Bolts, indicated at 27 and 28, are then passed through the openings 25 of the arms and through the plates 15 and 16. It will here be noted, particularly upon reference to Fig. 3, that a squared shoulder 29 is formed on each bolt at a point adjacent the head 30 thereof. This shoulder, upon being received within a squared opening 25, is adapted to hold the bolt against rotation, so that a wing nut 31 may be easily applied to or removed from the bolt without the employment of a wrench or screw-driver.

It is now to be observed that each of the members 15 and 16 is provided with two arcuate series of spaced apertures. It will be seen upon reference to Fig. 1 particularly that the lower bolt 27 may be inserted through the next to the lowermost aperture of the one arcuate series, and that the upper bolt 28 may be then inserted through the uppermost aperture of the other arcuate series. It will, of course, be apparent that the two arcuate series of the two members 15 and 16 are designed to register when the plates are engaged against each other, as in Fig. 2.

When the bolts 27 and 28 are applied to the plates 15 and 16 in the manner above noted, the handle 10 is positioned at an angle, which has been found to serve all ordinary purposes. It may be desirable, however, under some circumstances, to obtain a further adjustment of the handle by inserting the bolt 27 through the aperture 33 which constitutes the lowermost aperture of each arcuate series. When the shank is thus disposed, the handle extends more nearly vertical with respect to the blades than when positioned in the manner shown in Fig. 3. If it is desired to arrange the handle in parallel relation to the plane of the blades, the bolt 27 may be inserted through the next to the uppermost aperture 34.

As indicated by dotted lines in Fig. 2, it is possible to reverse the position of the handle so that, when the cutting edges of one side of the tool become dull, the handle may be shifted so as to enable the operator to use the other cutting edges.

In use, the blades are adapted to be pulled through the top soil of the garden slightly below the surface so as to insure the cutting of the weeds at their roots. In this connection, it will be observed that, when the members 15 and 16 are properly connected, they form in reality a cutting blade which will mow through the top soil without encountering any material interference.

The utility of the guide members will now be apparent. It will be seen that, when the cutting blades are being pulled through the earth below the surface, the guide members will enable the operator to determine the exact location of the ends of the cutting blades so that there will be no danger of cutting the vegetables at their roots.

In reduction to practice, it has been found that the form of this invention, illustrated in the drawings, and referred to in the above description as the preferred embodiment, is the most efficient and practical; yet realizing that the conditions concurrent with the adoption of this device will necessarily vary, I desire to emphasize the fact that various minor changes in details of construction, proportion and arrangement of parts may be resorted to, when required, without sacrificing any of the advantages of this invention, as defined in the appended claims.

Having thus described the invention, what is claimed as new is:—

1. A device of the character described including a pair of substantially L-shaped plate members, a handle member, an attaching shank connected to the handle and having a terminal bifurcation, the corresponding portions of the plate members being engaged with each other and disposed within the bifurcation, and bolts passing through the attaching shank and portions of the plates disposed therein, the said portions of the plates being formed to receive the bolts at a plurality of spaced points whereby the attaching shank may be adjusted relative thereto.

2. A device of the character described including a pair of substantially L-shaped plates, the corresponding portions of said plates being flatly engaged with each other and forming a body portion, the other portions of the plates being sharpened on their edges providing cutting blades, the portions of the plates constituting the body member being provided with registering series of apertures, a handle, a shank having a ferrule receiving the handle and having one terminal bifurcated, producing parallel spaced arms, said arms being disposed to embrace the said body member, and bolts passing through the arms and through the apertures of the body member for adjustably and detachably securing the shank thereto.

3. A device of the character described including a pair of substantially L-shaped plate members having their corresponding portions engaged and forming a body member, an attaching shank receiving the said body member, bolts passing through the attaching shank and the body member for detachably and adjustably securing the shank thereto, a handle, a ferrule formed on the shank to receive the handle, and a pair of guide strips secured to the outer terminals of the plate members and extending at right angles thereto and to the adjacent portions of the plates and in parallel relation to the said body member.

4. A device of the character described including a body portion provided with a laterally projecting blade, a handle shank connected to the body portion, and an upstanding guide detachably connected to the blade.

5. A device of the character described including a body portion having a blade extending laterally upon each side thereof, a handle shank carried by the body portion, and an upstanding guide carried by one of said blades at its outer extremity, one face of said guide being arranged substantially parallel with the adjacent end edge of the blade.

6. A device of the character described including a pair of annular plate members providing a body portion having a blade extending laterally upon each side thereof, handle receiving means adjustably mounted upon the body portion and connecting the said plate members, and a guide detachably connected to the outer extremity of one of said blades and extending upwardly therefrom in substantially parallel relation to the body portion.

7. A device of the character described including separable angular plate members, each having one portion adapted to mate with the corresponding portion of the other member to provide a body portion having blades extending laterally therefrom, means embracing the body portion and connecting the said plates, said means being adapted to receive a handle, and being adjustable upon the body portion, and means for holding said first mentioned means at adjustment.

8. A device of the character described including separable plate members providing a body portion having a blade extending laterally upon each side thereof, said blades upon their longitudinal edges being formed with cutting edges, a handle shank detachably and adjustably mounted upon the body portion, the said shank connecting the plate members, and upstanding guides carried by the blades at the outer extremities thereof, said guides being detachably connected to the blades.

9. A device of the character described including a body portion having a blade extending laterally upon each side thereof, each of said blades being formed to receive a guide, a handle shank carried by the body portion, and a guide carried by one of said blades and adapted for connection with the other blade.

In testimony whereof I affix my signature in presence of two witnesses.

ALBERT J. WOOD.

Witnesses:
W. A. WATERMAN,
A. E. BAUCH.

Copies of this patent may be obtained for five cents each, by addressing the "Commissioner of Patents, Washington, D. C."